(12) United States Patent
Whitham

(10) Patent No.: US 8,762,579 B2
(45) Date of Patent: Jun. 24, 2014

(54) VERIFIABLE DATE STAMP ACROSS MULTIPLE TIME ZONES

(76) Inventor: Charles L. Whitham, Reston, VA (US)

( * ) Notice: Subject to any disclaimer, the term of this patent is extended or adjusted under 35 U.S.C. 154(b) by 229 days.

(21) Appl. No.: 13/018,924

(22) Filed: Feb. 1, 2011

(65) Prior Publication Data

US 2011/0191498 A1  Aug. 4, 2011

Related U.S. Application Data

(60) Provisional application No. 61/300,521, filed on Feb. 2, 2010.

(51) Int. Cl.
*G06F 1/12* (2006.01)
(52) U.S. Cl.
CPC ........................................ *G06F 1/12* (2013.01)
USPC ........................................ 709/248; 707/104.1
(58) Field of Classification Search
CPC ........................................................... G06F 1/12
USPC .......................... 707/999.107, 104.1; 713/400
See application file for complete search history.

(56) References Cited

U.S. PATENT DOCUMENTS

| | | | | |
|---|---|---|---|---|
| 6,959,192 | B1 * | 10/2005 | Cannon et al. ............. | 455/456.3 |
| 2003/0070072 | A1 * | 4/2003 | Nassiri .......................... | 713/168 |
| 2009/0222482 | A1 * | 9/2009 | Klassen et al. ............. | 707/104.1 |
| 2010/0274728 | A1 * | 10/2010 | Kugelman ..................... | 705/80 |

OTHER PUBLICATIONS

ERD SOP 4.8: Calbration/Verification and Maintenance of Measuring and Test Equipment (M&TE) Revision 5 published Oct. 2, 2000, Dibley et al. pp. 1-10.*
GPS Video Overlay Unit with Keyboard Interface, The Black Box Camera website for the GPSBOXKBD Video Overlay Units dated Jul. 5, 2009.*
ERD SPO 4.8 Calibration/Verification and Maintenance of Measuring and Test Equipment (M&TE)—Revision: 5 published Oct. 2, 2000 Dibley et al.*
GPS Video Overley Boards website captured Mar. 10, 2008 Black Box Camera et al.*

* cited by examiner

*Primary Examiner* — Boris Gorney
*Assistant Examiner* — Gary Dennis
(74) *Attorney, Agent, or Firm* — Whitham Curtis Christofferson & Cook, PC

(57) ABSTRACT

A verifiable date stamp for use in portable electronic devices automatically and transparently determines within the portable device or devices the correct date and time that a document or image is created. By keeping periodic records of tests for accuracy of the date and time of the device(s), it will be possible to provide admissible evidence of the date stamps generated by the portable devices. The date stamp provided by the invention includes not only date and time but, in addition, GPS location (latitude, longitude and altitude) and time zone. In some embodiments which involve the use of video, the date stamp includes beginning and ending time and, optionally, average velocity, if any, for the time duration of the video clip.

8 Claims, 5 Drawing Sheets

VERIFIABLE DATE STAMP ACROSS MULTIPLE TIME ZONES

CROSS-REFERENCE TO RELATED APPLICATIONS

This application claims priority to U.S. provisional application 61/300,521, filed Feb. 2, 2010, which is incorporated herein by reference.

BACKGROUND OF THE INVENTION

1. Field of the Invention

The invention is directed to a verifiable date stamp feature for use in portable electronic devices, such as digital cameras, smart phones and notebook computers, that functions automatically across time zones.

2. Background Description

Many electronic devices having multiple functions, such as smart phones and some digital cameras, include GPS (Global Positioning Satellite) receivers. Such receivers are now implemented on a single IC (integrated circuit) chip and can be easily incorporated into other portable devices, such as notebook computers. In addition, smart phones and some laptop computers incorporate digital cameras. Some of these cameras include a video as well as a still photographic function.

When traveling across time zones, it is necessary for the users of these portable devices to set the time, date and the time zone in the device for correct recording of the time in the device. Should the user forget to make these settings, any recordation of time and date in the device is likely to be in error. If the portable device is being used to provide legally probative evidence of an event or condition, the likelihood of an error in the date and time of documentary evidence will be called into question. Thus, for example, if an insurance adjuster is provided with a notebook computer and a digital camera to document a claim, it is important that any document contemporaneously generated on the notebook computer and recorded with the digital camera have the correct date and time and, further, that the date and time be verifiable.

SUMMARY OF THE INVENTION

The invention automatically and transparently avoids this problem by a determination within the portable device or devices of the correct date and time that a document or image is created. By keeping periodic records of tests for accuracy of the date and time of the device(s), it will be possible to provide admissible evidence of the date stamps generated by the portable devices. The date stamp provided by the invention includes not only date and time but, in addition, GPS location (latitude, longitude and altitude) and time zone. In some embodiments which involve the use of video, the date stamp includes beginning and ending time and, optionally, average velocity, if any, for the time duration of the video clip.

The system can be incorporated into any portable device for which it is desired to generate verifiable date stamps of documents and/or images. A preferred embodiment is implemented in a notebook computer with a built in camera and GPS receiver, but if only images are to be accurately date stamped, then an embodiment of the invention may be incorporated in a smart phone or digital camera. If the camera is incorporated in a notebook computer, the objective lens of the camera is preferably located on the outside cover of the computer, that is, on the side opposite the display screen, so that the camera can be pointed at a scene and controlled from the user interface (i.e., keyboard, pointing device, etc.). In either embodiment, the camera can be either a still camera or a video camera or, preferably, a camera having both still camera and video camera functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
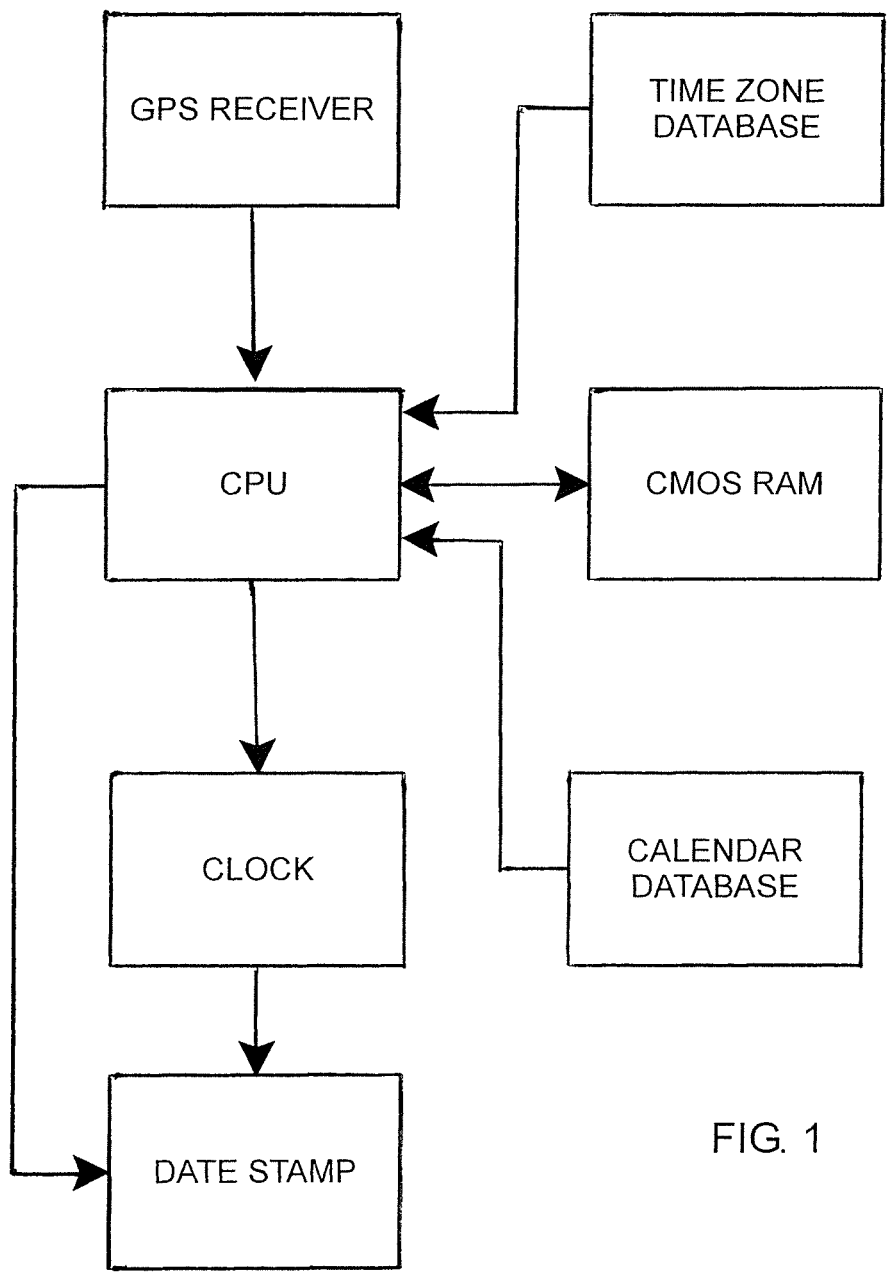
FIG. 1 is a block diagram showing the basic system according to the invention.
Figure 2:
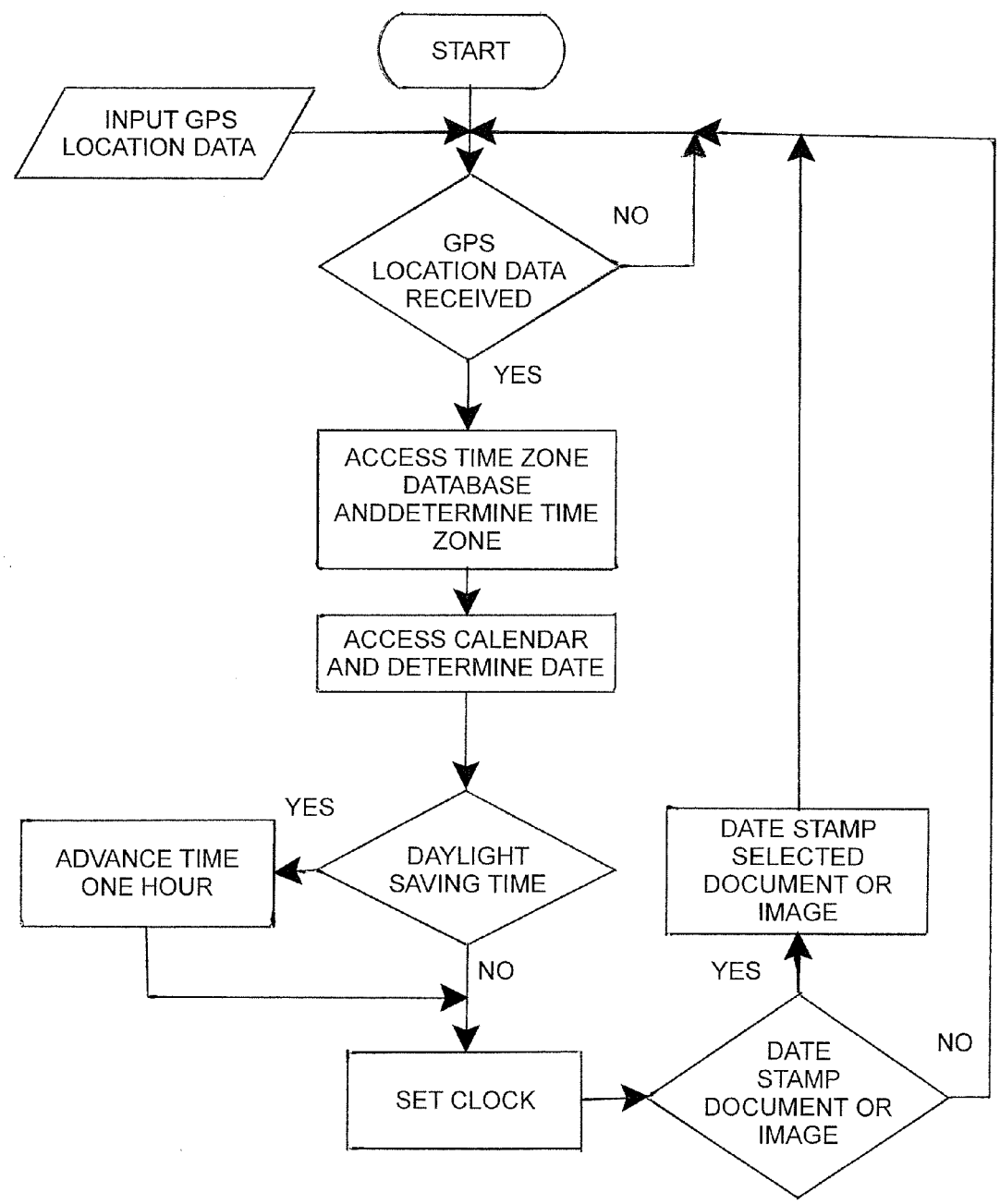
FIG. 2 is a flow diagram illustrating the logic of the invention implemented by the system of FIG. 1.

FIG. 1 shows the basic system, and FIG. 2 shows the logic flow diagram of the process implemented by the system. At the center of the system is a CPU (Central Processing Unit) which is supported by a non-volatile memory, such as a CMOS (Complementary Metal Oxide Semiconductor) RAM (Random Access Memory) which is capable of storing a program or programs that control the operations of the CPU. The CPU periodically polls the GPS receiver to receive location and time data from a GPS receiver. When this data is received, the CPU accesses a time zone database to determine the time zone in which the portable device is located. The CPU next accesses a calendar database to determine the date. A determination is made, based on the location, time zone, and date whether the current time is standard time or daylight savings time. The time zone and date might, for example, indicate daylight savings time, but the location might indicate standard time. For example, Arizona remains on standard time even though Utah, in the same time zone, switches to daylight savings time. If daylight savings time is determined, the time is adjusted to reflect that. In either case the clock in the portable device is set to the correct time and date. If a document is prepared on the device or an image is recorded, the document is date stamped with the correct day, time and location of when the and where the document was prepared and/or the image recorded. This date stamp data is recorded in the image or document metadata and, in some embodiments, may include in addition to location (latitude, longitude and altitude) a geographic name, such as a city or town. The geographic name can be generated by access to a GIS (Geographic Information System) database, such as Google Maps.

Figure 3:
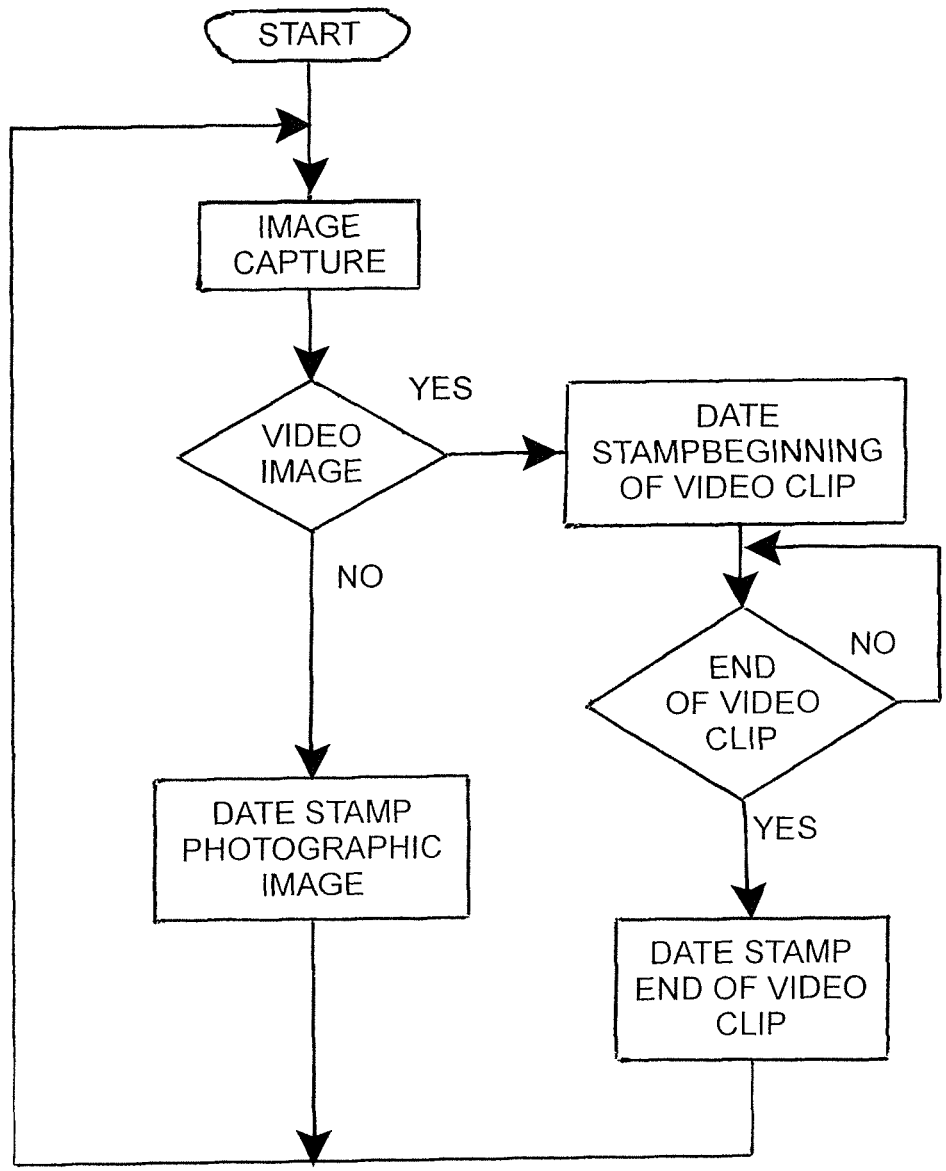
FIG. 3 is a flow diagram showing in more detail the process for date stamping of captured images.

FIG. 3 shows in more detail the process for date stamping of captured images. Image capture may be either a still photographic image or a video clip. If a video clip, the beginning of the video clip is date stamped and the end of the video clip is date stamped. Again, these date stamps include information on the location and time zone. In addition, in some embodiments, the average velocity, derived from the GPS receiver, for the duration of the video clip can also be included in the date stamp information recorded with the metadata of the video clip. If the image captured is a photographic still image, the still image is date stamped upon capture of the image.

Figure 4:
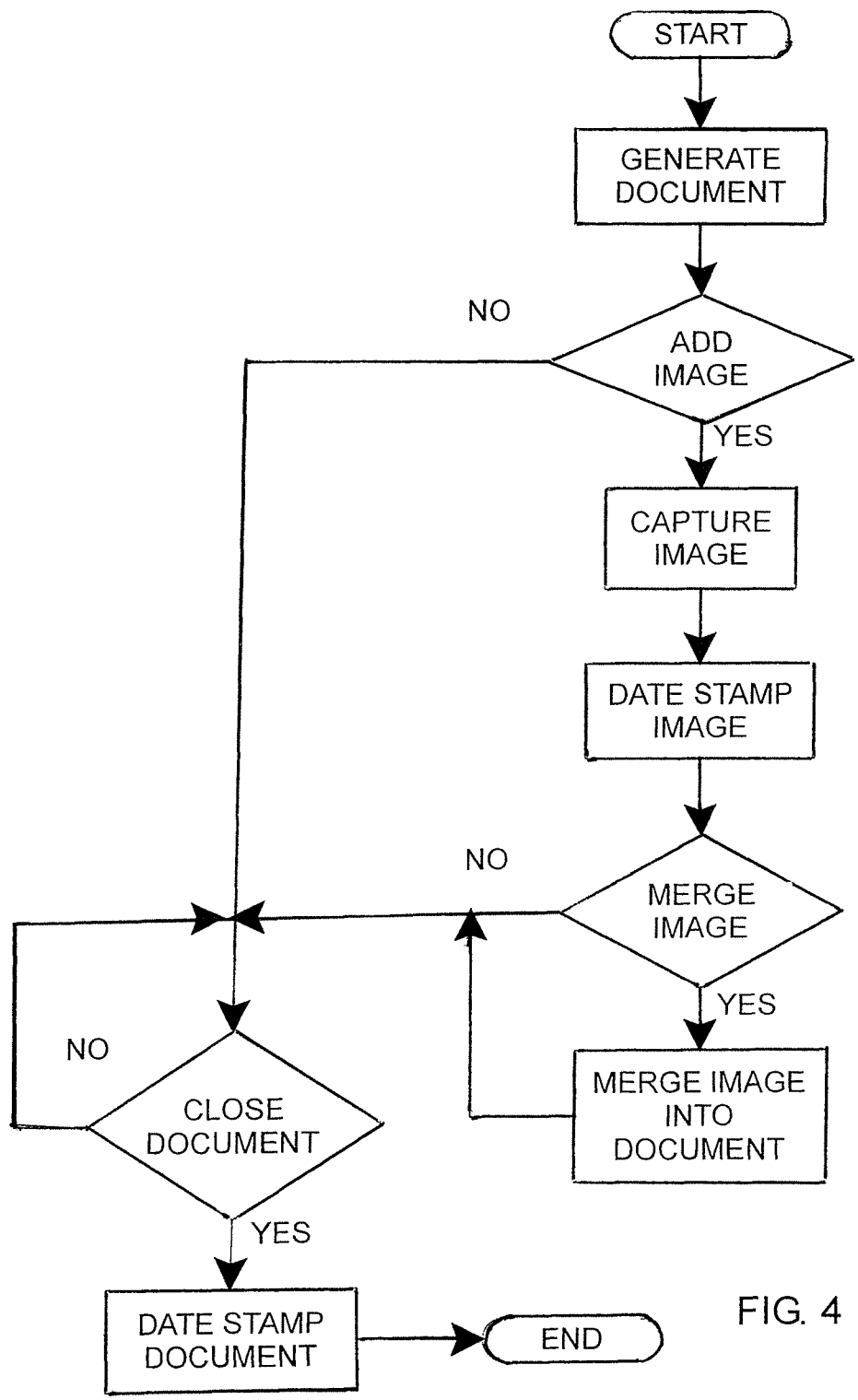
FIG. 4 is a flow diagram illustrating the process of generating a document according to an embodiment of the invention.

FIG. 4 illustrates the process of generating a document according to an embodiment of the invention. This process might be implemented with a notebook computer having a built-in camera. During the course of generating the document, a determination is made as to whether an image is to be added to the document. If so, the image is captured and date stamped as in the process shown in FIG. 3. Note that the image that is to be added to the document can be either a photographic still image or a video clip. A determination is next made as to whether the image is to be merged into the document being generated. If so, the image, with its date stamp, is merged into the document. When the document is completed, it is closed and as part of the process of closing the document, the document is date stamped. Note that this date stamp is for the document which may or may not include merged images and the date stamp of the document will be separate from the date stamps of any merged images.

Figure 5:
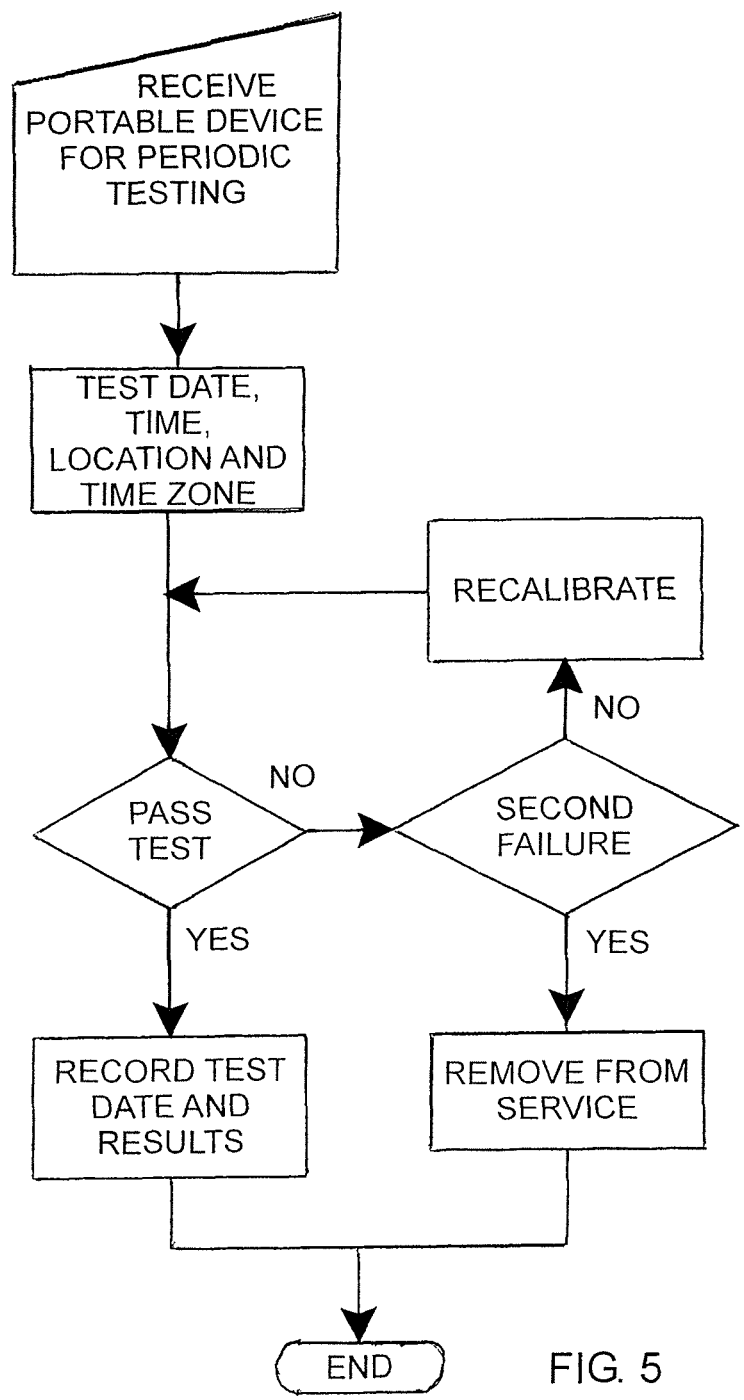
FIG. 5 is a flow diagram showing the process of maintaining the portable devices so that any documents and/or images are verifiable.

FIG. 5 shows the process of maintaining the portable devices so that any documents and/or images are verifiable. On a periodic basis, a portable device is received for testing. The portable device is subjected to testing for accuracy in date, time, location and time zone. If the portable device passes the tests, the results of the tests are recorded together with date of the test and name or other identification of the person or persons performing the tests. However, should the portable device fail one or more of the tests, then on the first failure, it is recalibrated and tested again. If on retesting, the portable device passes the tests, the results are recorded as before. If, however, the portable device has failed test(s) twice or some other number of times, it is removed from service.

The invention can be advantageously used in several environments. These include the insurance adjuster previously mentioned. The invention may be used in medical applications to document a patient's condition before evacuation from a hostile environment to a location where medical care can be administered. The invention may be used in security and police services where the portable device may be transited across time zones. The invention may also be used by photojournalists who are frequently crossing time zones in their coverage of news.

While the invention has been described in terms of preferred embodiments, those skilled in the art will recognize that the invention can be practiced with modification within the spirit and scope of the appended claims.

I claim:

1. A method of providing a portable electronic device with a verifiable date stamp feature across multiple time zones comprising the steps of:
   periodically polling a GPS (Global Positioning System) receiver to receive location and time data;
   accessing a time zone database to determine the time zone in which the portable device is located;
   accessing a calendar database to determine the date;
   determining from the date whether the location within the time zone is currently on daylight saving time;
   if daylight savings time is determined, adjusting the time to reflect that the location is currently on daylight saving time;
   setting a clock of the portable electronic device to the correct time and date;
   when a document is prepared on the device or an image is recorded, date stamping the document or image with the correct day, time and location of when the and where the document was prepared and/or the image recorded, the date stamp data being recorded in the image or document metadata;
   on a periodic basis, receiving the portable device for testing;
   subjecting the portable device to testing for accuracy in date, time, location and time zone;
   if the portable device passes the testing in said subjecting step, recording results of the tests together with date of the test and name or other identification of the person or persons performing the testing;
   should the portable device fail the testing in said subjecting step, then on the first failure, recalibrating the portable device and retesting;
   if on retesting, the portable device passes the tests, recording the results of the tests together with data of the test and name or other identification of the person or persons performing the retesting;
   if the portable device has failed retesting a predetermined number of times, removing the portable device from service; and
   maintaining recorded results of tests together with dates of tests and name or other identification of the person or persons performing the tests which are coupled with a date stamped document or image and provide a verifiable date stamp feature for said date stamped document or image across multiple time zones providing legally probative evidence of an event or condition recorded by the portable electronic device such that the date stamped document or image produced by the device is self authenticating as business records.

2. A method of providing a portable electronic device with a verifiable date stamp feature across multiple time zones as recited in claim 1, wherein the date stamp data includes in addition to location (latitude, longitude and altitude) a geographic name generated by access to a GIS (Geographic Information System) database.

3. A method of providing a portable electronic device with a verifiable date stamp feature across multiple time zones as recited in claim 1, date stamping either a still photographic image or a video clip comprising the steps of:
   if a video clip, date stamping a beginning of the video clip and date stamping an end of the video clip, the date stamps including information on the location, date, time, and time zone;
   if the image captured is a photographic still image, date stamping the still image upon capture of the image, the date stamp including information on the location, date, time, and time zone.

4. A method of providing a portable electronic device with a verifiable date stamp feature across multiple time zones as recited in claim 3, further comprising the steps of:
   deriving from the GPS receiver an average velocity for a duration of the video clip; and
   including the average velocity in the date stamp information recorded with the metadata of the video clip.

5. A method of providing a portable electronic device with a verifiable date stamp feature across multiple time zones as recited in claim 1, wherein the portable electronic device is capable of generating a document and has a built-in camera, further comprising the steps of:
   during the course of generating the document, determining whether an image is to be added to the document;
   if an image is to be added to the document, capturing and date stamping an image;
   determining whether the image is to be merged into the document being generated;

if the image is to be merged with the document, merging the image, with its date stamp, into the document; and when the document is completed, closing the document and as part of the process of closing the document, date stamping the document, this date stamp being for the document which may or may not include merged images and the date stamp of the document will be separate from date stamps of any merged images.

6. A method of providing a portable electronic device with a verifiable data stamp feature across multiple time zones as recited in claim 5, date stamping either a still photographic image or a video clip comprising the steps of:

if a video clip, date stamping a beginning of the video clip and date stamping an end of the video clip, the date stamps including information on the date, location, time, and time zone;

if the image captured is a photographic still image, date stamping the still image upon capture of the image, the date stamp including information on the date, location, time, and time zone.

7. A method of providing a portable electronic device with a verifiable date stamp feature across multiple time zones as recited in claim 6, wherein the date stamp data includes in addition to location (latitude, longitude and altitude) a geographic name generated by access to a GIS (Geographic Information System) database.

8. A method of providing a portable electronic device with a verifiable date stamp feature across multiple time zones as recited in claim 6, further comprising the steps of:

deriving from the GPS receiver an average velocity for a duration of the video clip; and including the average velocity in the date stamp information recorded with the metadata of the video clip.

* * * * *